(12) United States Patent
Abe

(10) Patent No.: US 7,007,969 B2
(45) Date of Patent: Mar. 7, 2006

(54) AIRBAG MODULE

(75) Inventor: Kazuhiro Abe, Shiga (JP)

(73) Assignee: Takata Corporation, Tokyo (JP)

( * ) Notice: Subject to any disclaimer, the term of this patent is extended or adjusted under 35 U.S.C. 154(b) by 270 days.

(21) Appl. No.: 10/122,956

(22) Filed: Apr. 17, 2002

(65) Prior Publication Data

US 2002/0153709 A1   Oct. 24, 2002

(30) Foreign Application Priority Data

Apr. 18, 2001   (JP)   ............................. 2001-119917

(51) Int. Cl.
*B60R 21/16*   (2006.01)
(52) U.S. Cl. ................. 280/728.2; 280/731; 280/728.1
(58) Field of Classification Search ............ 280/728.2, 280/728.3, 731, 743.1, 750, 728.1, 729, 730.1, 280/730.2; 74/552; 200/61.55, 61.54
See application file for complete search history.

(56) References Cited

U.S. PATENT DOCUMENTS

| | | | | |
|---|---|---|---|---|
| 6,139,051 A | * | 10/2000 | Fujita | ......................... 280/731 |
| 6,244,618 B1 | * | 6/2001 | Yokota | ..................... 280/728.3 |
| 6,257,615 B1 | * | 7/2001 | Bohn et al. | .............. 280/728.2 |
| 6,299,201 B1 | * | 10/2001 | Fujita | ......................... 280/731 |
| 6,422,602 B1 | * | 7/2002 | Ishii et al. | ............... 280/743.1 |
| 6,474,682 B1 | * | 11/2002 | Ikeda et al. | ................. 280/731 |

* cited by examiner

*Primary Examiner*—Hau Phan
(74) *Attorney, Agent, or Firm*—Foley & Lardner LLP

(57) ABSTRACT

An airbag module of a type that only a module cover is moved to actuate a horn switch and at least one switch unit is arranged between spoke-fitting portions, wherein a portion around either of spoke-fitting portions on both sides of the switch unit can be prevented from being excessively deformed, thereby providing an improved horn switch operational feeling. Hooks are loosely fitted in holes formed in leg portions of a module cover for a predetermined space, whereby the module cover can move vertically. As a portion around lower left and lower right spoke-fitting portions is pressed, a switch unit arranged therebetween is actuated. The spoke-fitting portions are provided with stoppers projecting therefrom. The stoppers are disposed such that their ends can come in contact with extension pieces of the horn switch supporting member.

10 Claims, 6 Drawing Sheets

AIRBAG MODULE

BACKGROUND

The present invention relates to a an airbag module to be installed in a vehicle and, more particularly, to an airbag module having a horn switch.

Airbag modules for protecting an occupant in a driver's seat of a vehicle (hereinafter, referred to as "driver-side airbag module") include a retainer (sometimes, referred to as "container"), an airbag of which base end side is fixed to the retainer, and a module cover which is attached to the retainer to cover the folded airbag. In addition, an inflator (gas generator) for generating gas to inflate the airbag is normally fixed to the retainer. As the inflator generates gas in the event of vehicle collision or the like, the module cover is torn and the airbag deploys in front of the occupant in the driver's seat.

The module cover is provided with tear lines (sometimes, referred to as "thin-wall portion" or "easy-to-break portion"). The module cover is torn along the tear lines when the rear surface of the module cover is pressed by the airbag being inflated.

Some of driver-side airbag modules have a horn which is operated by pressing the module cover of the airbag module to activate a horn switch so as to cause the horn to sound. Such airbag modules with a horn switch are categorized into various types including a type in which the module cover and the retainer are movable together in the axial direction of a steering column so as to actuate the horn switch and a type in which the retainer is fixed to a steering wheel and only the module cover is movable.

Such airbag modules with a horn switch are further categorized into two types, one of which has three spoke-fitting portions formed in the module cover and the other one of which has four spoke-fitting portions formed in the module cover. In airbag modules having three spoke-fitting portions, the spoke-fitting portions are positioned on left and right portions and a lower portion inside a steering rim (the orientation is based on the steering wheel in a normal position in which the vehicle runs straight). The same holds true of the following description.). In airbag modules having four spoke-fitting portions, the spoke-fitting portions are positioned on upper left and upper right portions and lower left and lower right portions inside the steering rim as shown in FIG. 7.

In some airbag modules with a horn switch of the type having four spoke-fitting portions, switch units are arranged in the spoke-fitting portions, respectively. This arrangement increases the number of switch units for the horn switch and thus increases the cost. Therefore, some airbag modules of this type have three switch units in total, one of which is arranged at a middle portion between two spoke-fitting portions at the lower left and lower right sides (the lower left and lower right spoke-fitting portions) as shown in FIG. 7.

In this case, since the lower left and lower right spoke-fitting portions of the module cover are not backed up by any switch unit, the portions of the module cover should be pressed significantly deeply. That is, even after the horn switch is activated, the lower left or lower right portion of the module cover may be further deeply dented if the lower left or lower right portion of the module cover is further pressed. The driver may feel abnormality when the lower left or lower right portion of the module cover is deeply pressed and dented.

SUMMARY OF THE INVENTION

It is an object of the present invention to provide an airbag module with a horn switch of which one or more of switch unit is arranged between spoke-fitting portions, wherein the spoke-fitting portions backed up by no switch unit can be prevented from being excessively deeply dented, thus providing an improved horn switch operational feeling.

According to an embodiment of the present invention, an airbag module is provided. The airbag module includes: a folded airbag, a retainer to which the airbag is secured, a module cover for covering the airbag, and a horn switch which is actuated by pressing the module cover to move downward. The module cover includes a plurality of spoke-fitting portions, wherein at least one of switch units of the horn switch is disposed between the spoke-fitting portions. The module includes stoppers for preventing the spoke-fitting portions interposing the switch unit therebetween from being moved downward in excess of a predetermined value.

According to the airbag module, excess downward movement of the spoke-fitting portions, which are not backed up in a conventional design, can be prevented by the stoppers, thereby providing an improved horn switch operational feeling.

According to an embodiment of the present invention, the module cover is allowed to move in a direction toward the retainer, and each stopper preferably projects from a rear surface of said module cover. When the module cover moves a predetermined distance toward the retainer, an end of the stopper comes in contact with said retainer or a horn switch supporting member as an integral part of the retainer, thereby preventing the further movement of the module cover. In one embodiment of the present invention, the stoppers are formed as integral projections with the module cover during the molding of the module cover. Since the module cover is normally made by injection molding of resin, the stoppers can be precisely formed using a mold for injection molding.

According to another embodiment of the present invention, the module cover is allowed to move in a direction toward the retainer, and each stopper may be formed on said retainer or a horn switch supporting member as an integral part of the retainer. In this embodiment, when the module cover moves a predetermined distance toward the retainer, the module cover comes in contact with an end of the stopper, thereby preventing the further movement of the module cover.

According to the present invention, it is preferable that the stopper prevents the further downward movement of the spoke-fitting portion at the same time of or with slight delay from the actuation of the switch unit.

The stoppers may be formed on spokes (alternatively, the stopper formed on the module cover to come in contact with the spokes). Therefore, the steering wheel (spokes) may be provided with stoppers or stoppers may come in contact with the steering wheel.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Figure 1:
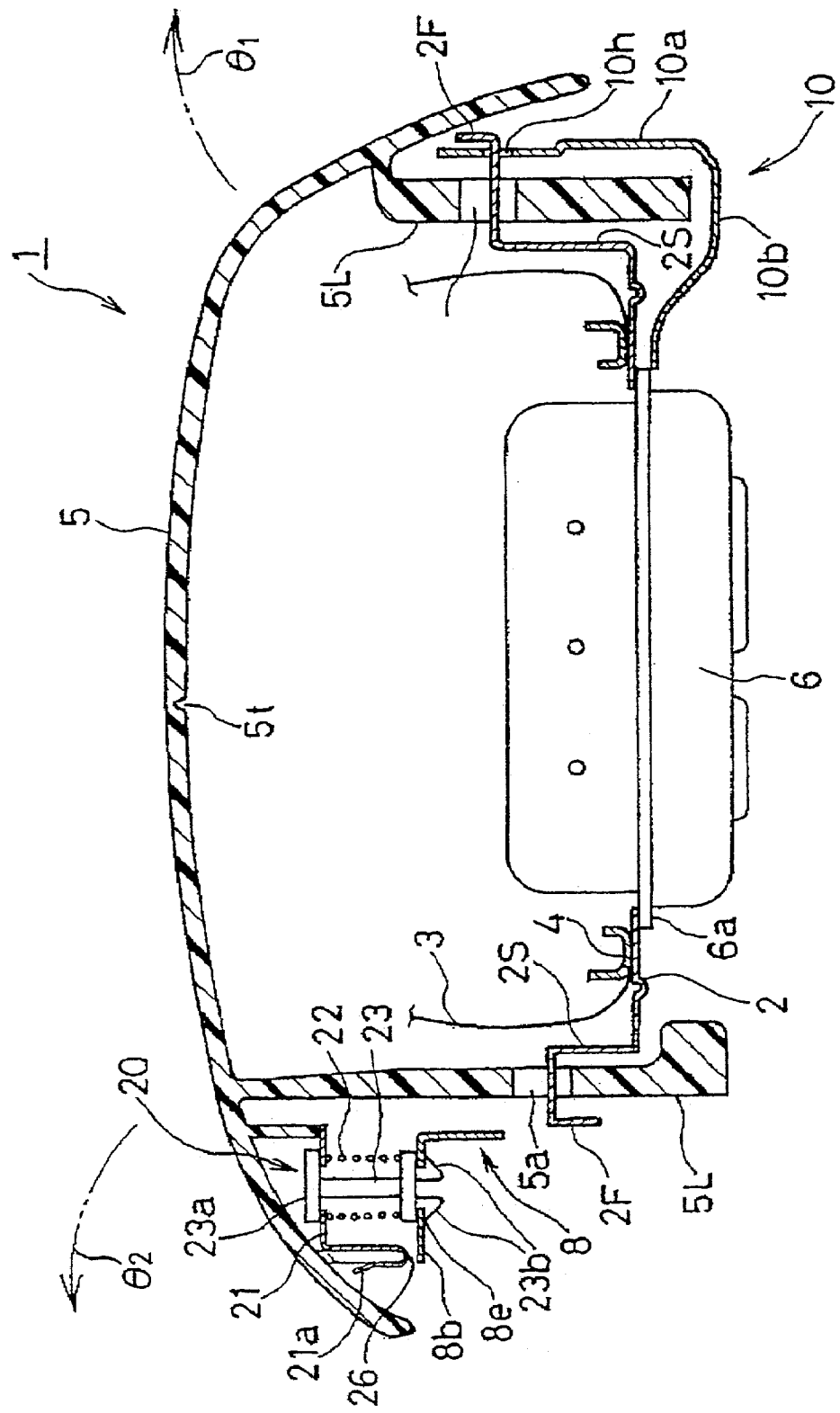
FIG. 1 is a sectional view along line I—I of FIG. 2, showing an airbag module according to an embodiment of the present invention.

Hereinafter, embodiments of the present invention will be described with reference to the attached drawings. As shown in FIG. 1, the airbag module 1 comprises a retainer 2, an airbag 3 fixed to the retainer 2 by an airbag mounting ring 4, an inflator 6 for inflating the airbag 3, and a module cover 5 covering the folded airbag 3. The module cover 5 is provided with tear lines 5t. When the airbag 3 is inflated by the inflator 6, the module cover 5 is torn along the tear lines 5t.

Figure 7:
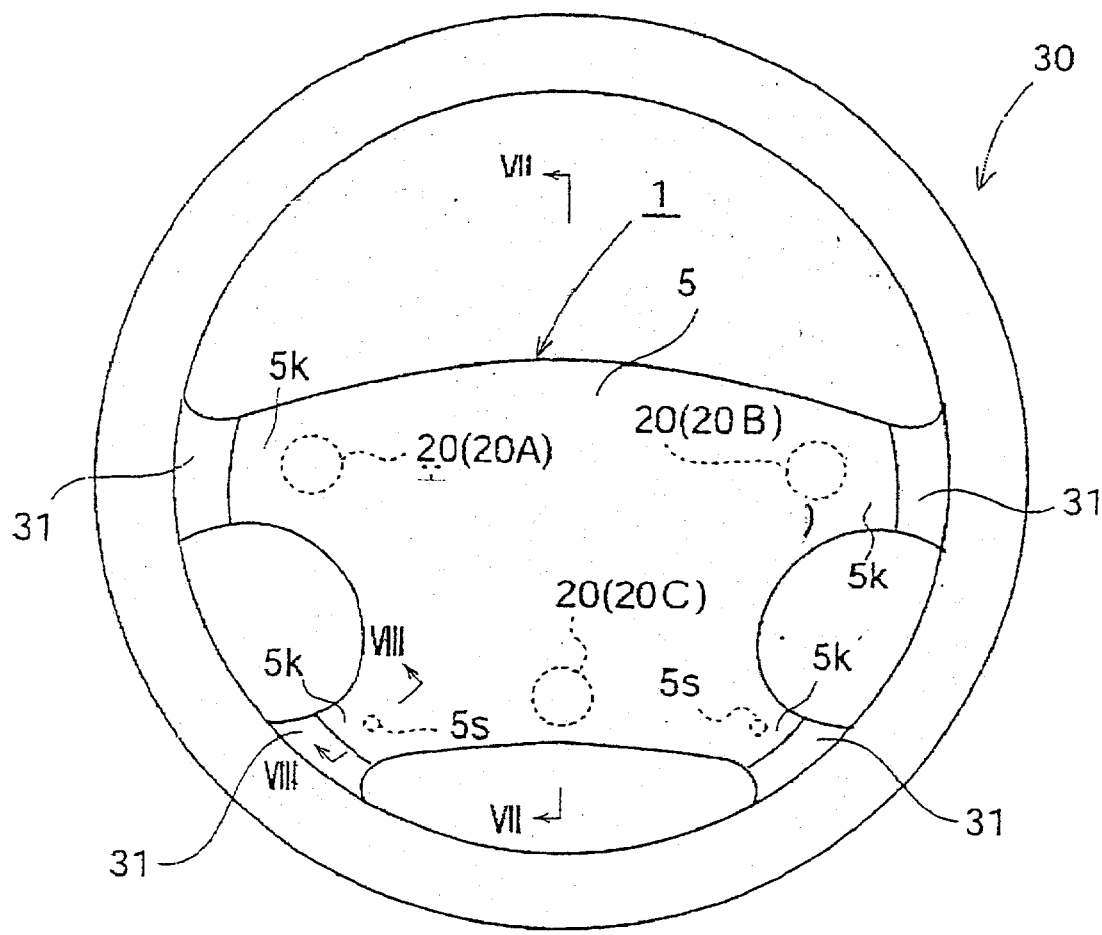
FIG. 7 is a front view of a steering wheel with the airbag module.
Figure 8:
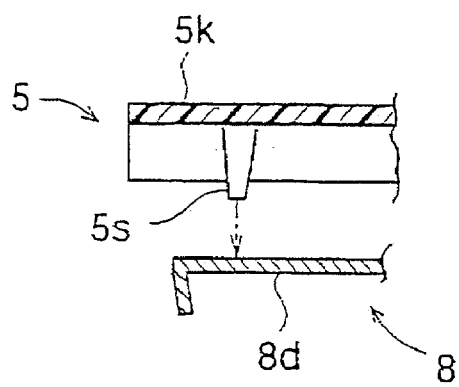
FIG. 8 is a sectional view taken along a line VIII—VIII of FIG. 7.
Figure 9:
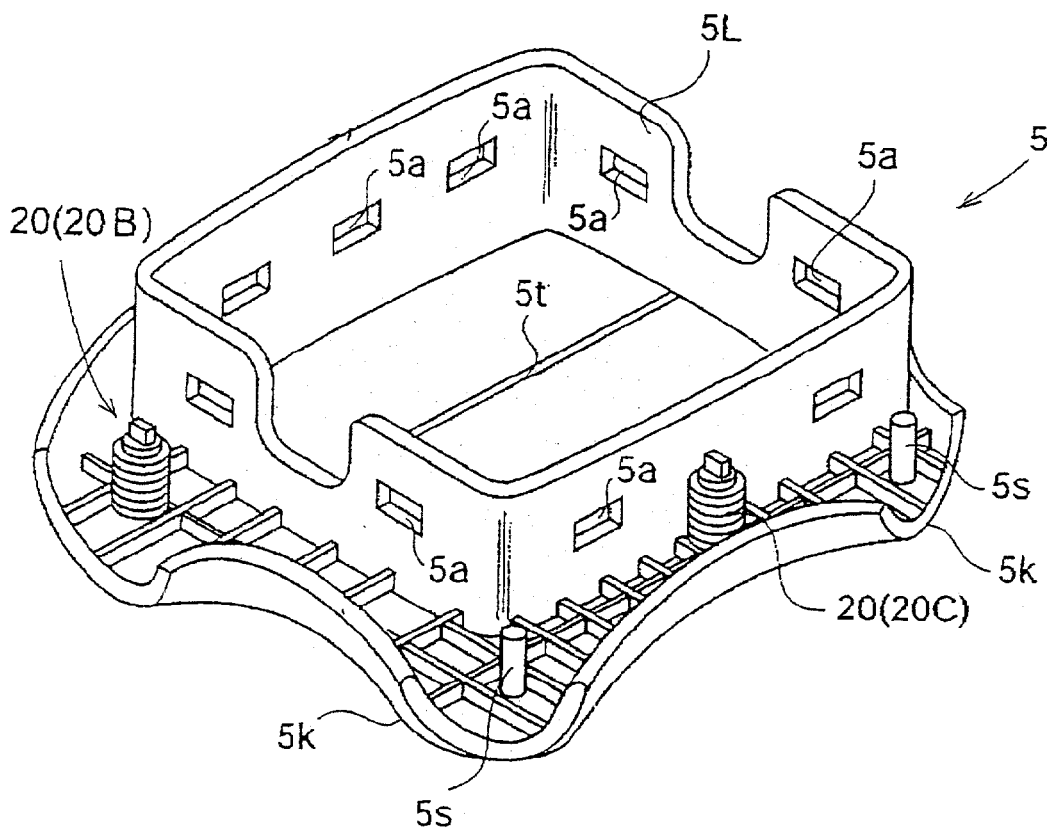
FIG. 9 is a perspective view of the module cover taken from the back side.

In the embodiment shown in FIGS. 7 and 9, the module cover 5 is provided with four spoke-fitting portions 5k for being engaged with four spokes 31 of a steering wheel 30. The module cover 5 is also provided with rod-like standing stoppers 5s projecting from rear surfaces of lower left and lower right spoke-fitting portions 5k.

The module cover 5 has leg portions 5L integrally formed on a rear surface of the module cover 5. Hooks 2F on side walls 2S, formed by bending, of the retainer 2 are inserted into holes 5a formed in the leg portions 5L. Each hook 2F is formed to extend in a L-like shape outwardly from the side wall 2S. The leg portions 5L are arranged to be spaced apart from the outer surfaces of the side walls 2S at a predetermined distance.

A restriction member 10 may be provided for restricting the leg portion 5L from coming off the side wall 2S. The restriction member 10 is arranged to extend along the outer surface of the leg portion 5L. The restriction member 10 includes standing walls 10a confronting and extending along the outer surface of the leg portion 5L with a predetermined space therebetween and a bottom portion 10b extending below the retainer 2. The standing walls 10a are provided with holes 10h through which the hooks 2F are inserted. As described further below, the bottom portion 10b is provided with holes for insertion of bolts 16.

The inflator 6 has a flange 6a. Bolts 15 projecting from the ring 4 are inserted through the holes of the retainer 2 and the flange 6a and are screwed by nuts 16, thereby securing the inflator 6 to the retainer 2 together with the airbag 3. Some of the bolts 15 are inserted through the holes of the bottom portion 10b of the restricting member 10, thereby securing the restriction member 10 to the retainer 2.

The folded airbag 3 may be held in a folded shape by a shape-holding member (not shown).

Figure 4:
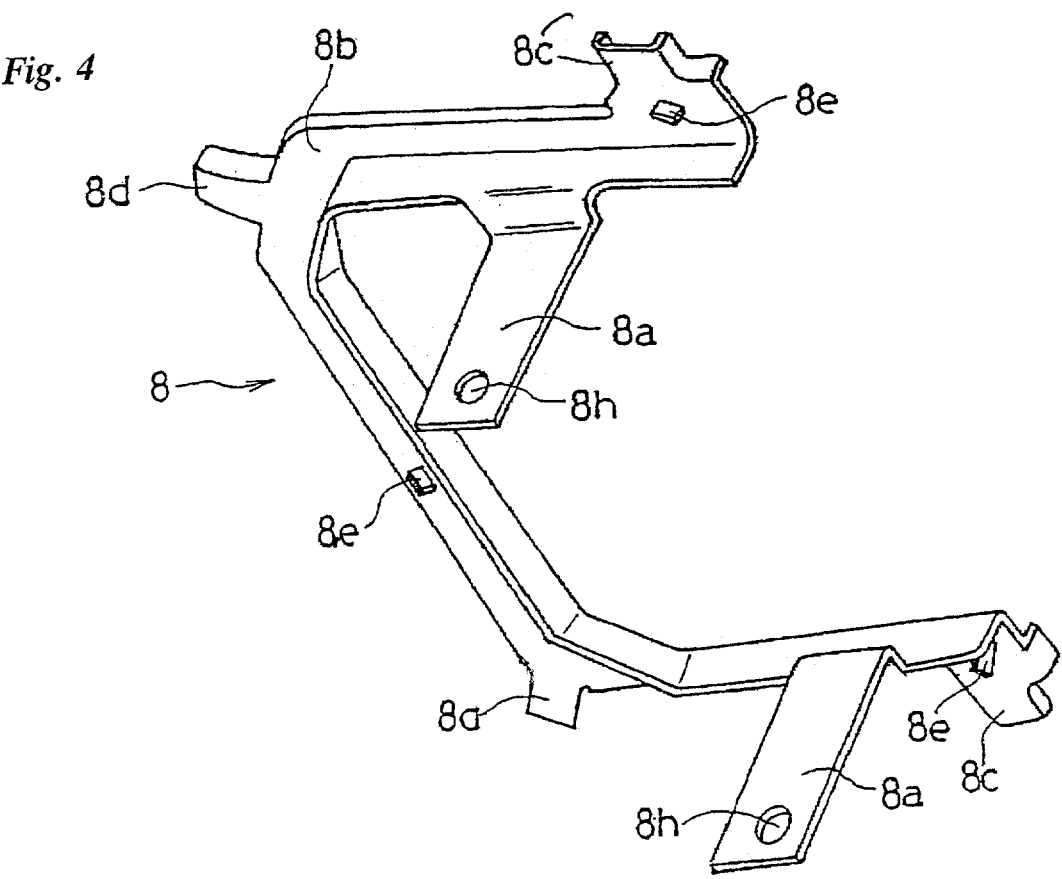
FIG. 4 is a perspective view of a horn switch supporting member.
Figure 5:
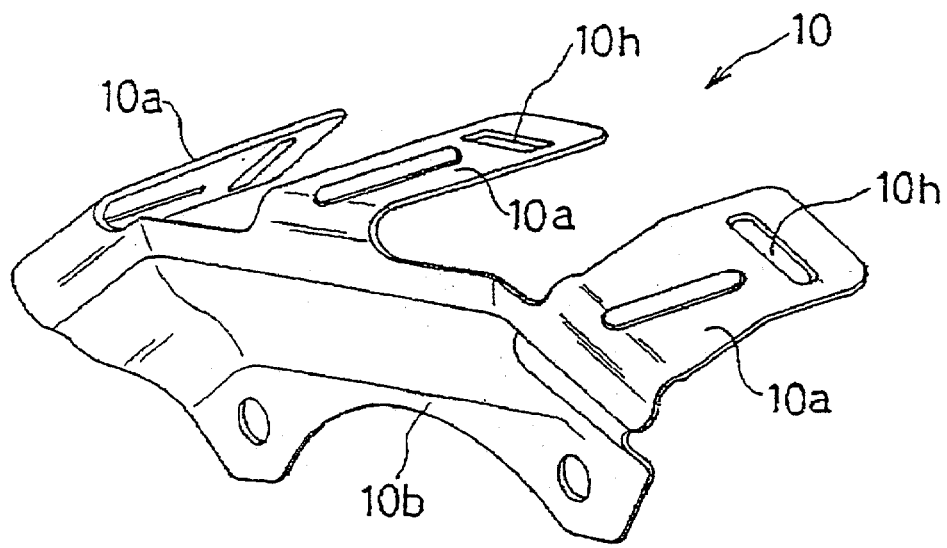
FIG. 5 is a perspective view of a restriction member.
Figure 6:
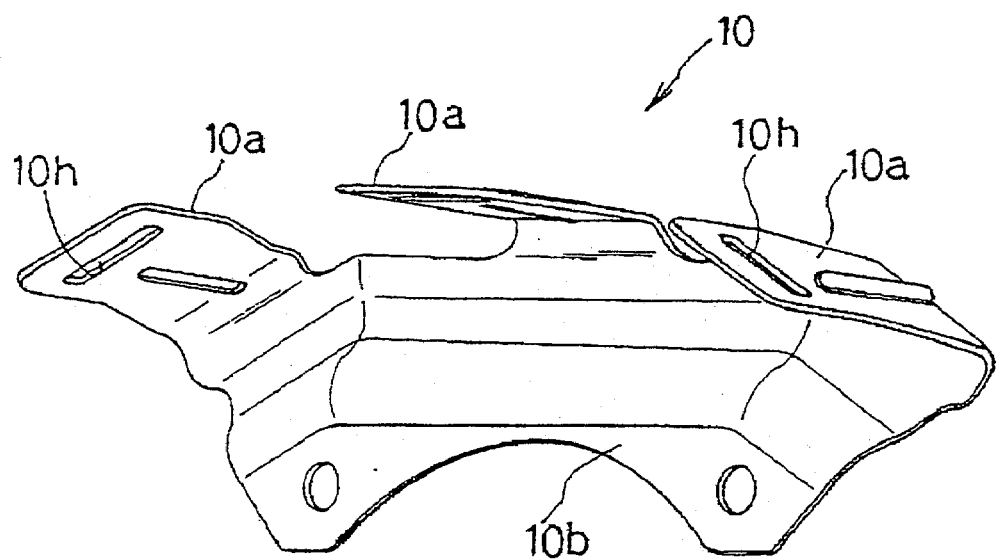
FIG. 6 is a perspective view of the restriction member taken from another side different from FIG. 5.

Base portions 8a of a horn switch supporting member 8 and projections 9 projecting downward from the rear surface of the retainer 2 are fixed to a bracket (not shown) of the steering wheel by bolts. The horn switch supporting member 8 is formed in a U-like configuration extending along three sides of the retainer 2 as shown in FIG. 4. An upper portion 8b of the horn switch supporting member 8 is positioned to confront rear surfaces the peripheral portions of the module cover 2 to extend in directions perpendicular to the movable direction of the module cover 2.

The horn switch supporting member 8 is provided with extension pieces 8c, formed on the upper portion 8b to extend in the lateral direction of the steering wheel (as mentioned above, the orientation is based on the steering wheel in a normal position in which the vehicle runs straight), and extension pieces 8d formed on the upper portion 8b to extend in the lower left and the lower right of the steering wheel. The end of each extension piece 8d in its extending direction engages a step (not shown) formed in the corresponding spoke 31 of the steering wheel 30. Each stopper 5s is disposed to confront the extension piece 8d.

Switch units 20A, 20B of the horn switch 20 are positioned between each of the two extension pieces 8c, 8c and the module cover 2. In addition, a switch unit 20C of the horn switch 20 is positioned at a middle portion between the extension pieces 8d, 8d. As shown in FIG. 4, reference numeral 8e designates holes for mounting the switch units 20A, 20B, and 20C.

Figure 2:
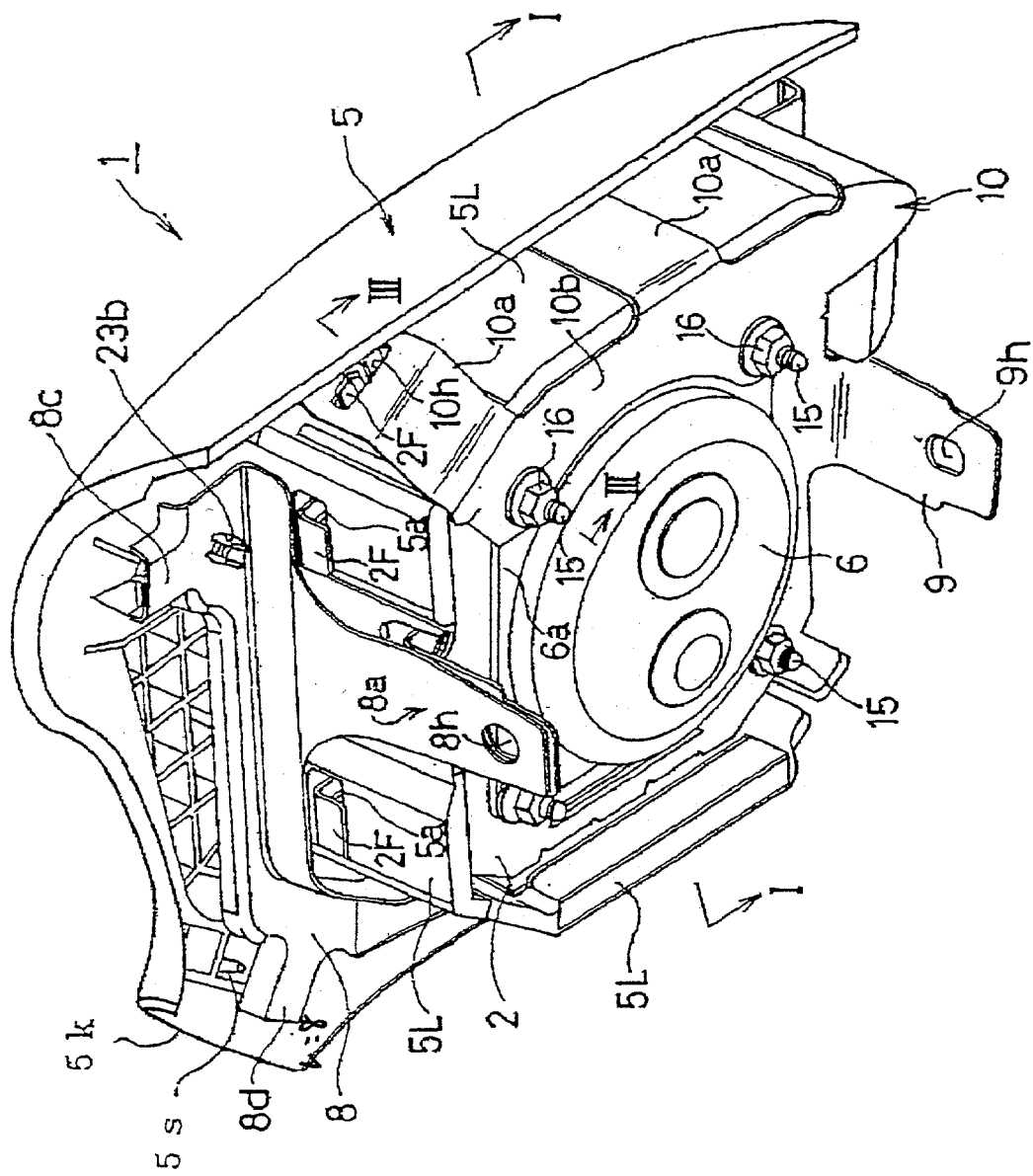
FIG. 2 is a perspective view of the airbag module according to the embodiment of the present invention shown in FIG. 1.
Figure 3:
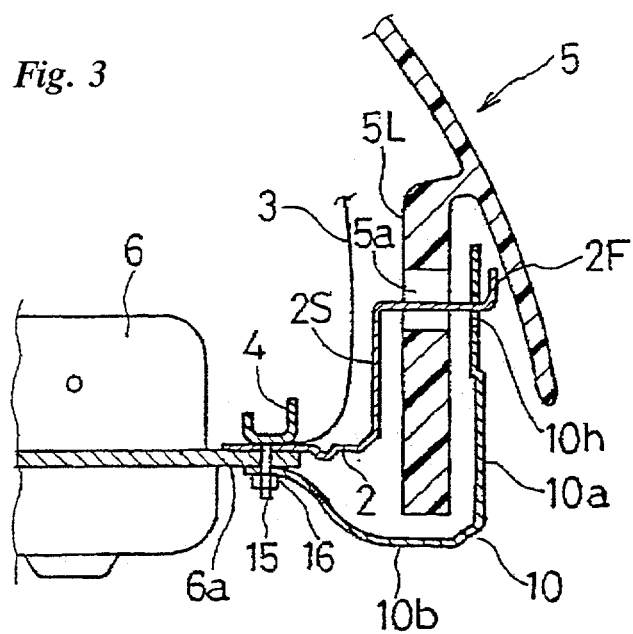
FIG. 3 is a sectional view taken along a line III—III of FIG. 2.

The horn switch supporting member 8 is arranged to extend along the left side, the right side, and the bottom side of the retainer 2. The base portions 8a are formed to project from portions extending along the left side and the right side of the retainer 2. As shown in FIG. 2, the base portions 8a and the projections 9 are provided with holes 8h, 9h for the insertion of bolts, respectively. The bolts are screwed into internal threads formed in the bracket.

The aforementioned shape-holding member (not shown) for holding the shape of the airbag 3 and the module cover 5 are spaced apart from each other for a predetermined distance. The hook 2F is loosely fitted in the hole 5a formed in the leg portion 5L of the module cover 5 for a predetermined space, whereby the module cover 5 can move vertically in FIG. 1. The horn switch 20 is actuated by pressing the module cover 5 to press one or more of the switch units.

As shown in the embodiment of FIG. 1, each switch unit of the horn switch 20 has a contact member 21, a coil spring 22, and a spring guide 23 surrounded by the coil spring 22. The contact member 21 has a clipping portion 21a which is fitted with a rib projecting from the rear surface of the module cover 5. The contact member 21 includes a contact 26 composed of a convex portion. A head 23a of the guide 23 is engaged with the contact member 21. As the module cover 5 is pressed, the contact 26 comes in contact with an upper portion 8b of the horn switch supporting member 8, whereby the horn switch 20 is actuated to cause the horn to sound.

The head 23a of the spring guide 23 is engaged with the contact member 21. On the other hand, a pair of elastic legs 23b at the bottom side are engaged with the hole 8e of the horn switch supporting member 8.

In the airbag module 1 having the aforementioned structure, as the module cover 5 is pressed, only the module cover 5 is moved to actuate the horn switch 20, thereby causing the horn to sound. When a portion around the lower left or lower right spoke-fitting portion 5k is pressed, the switch unit 20C is actuated. In this case, if the portion around the spoke-fitting portion 5k is pressed strongly even after the switch unit 20C is actuated, the stopper 5s comes in contact with the extension piece 8d, thereby preventing the portion around the spoke-fitting portion 5k of the module cover 5 from being further moved.

As the inflator 6 is actuated to generate gas in the event of a vehicle collision, the airbag 3 is inflated. The module cover 5 is torn along the tear lines 5t so that the airbag 3 is deployed into the vehicle cabin to receive the occupant. During this, the module cover 5 opens in the directions θ1, θ2 in FIG. 1.

Figure 10:
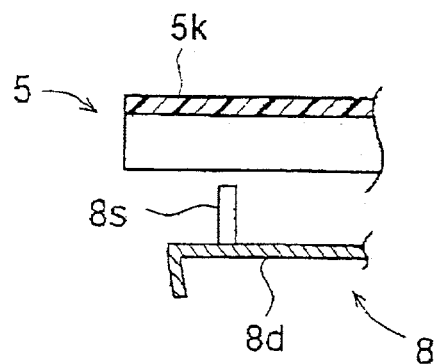
FIG. 10 is a sectional view showing the same part as shown in FIG. 8 of another embodiment.

Though the stoppers 5s are disposed on the module cover 5 in the aforementioned embodiment, stoppers 8s may be disposed on the extension pieces 8d of the horn switch supporting member 8 as shown in FIG. 10. In this case, when the spoke-fitting portion 5k is excessively strongly pressed, the spoke-fitting portion 5k comes in contact with the stopper 8s.

Though the horn switch supporting member 8 is provided separately from the retainer 2 and disposed along the retainer 2, the horn switch supporting member 8 and the retainer 2 may be integrally formed. Though the horn switch supporting member 8 is employed in the aforementioned embodiment, the horn switch may be directly mounted on the retainer in such a manner that the stoppers 5s are disposed to come in contact with the retainer. As shown in FIG. 10, it should be understood that the stoppers may be disposed on the retainer or supporting member to come in contact with the spoke-fitting portions 5k.

Though the airbag module of the above embodiment is of a type that only the module cover 5 is moved, the present invention can be applied to an airbag module of a type that the module cover 5 and the retainer 2 are moved together.

The priority application, Japanese application No. 2001-119917 filed Apr. 18, 2001, is incorporated herein by reference in its entirety.

As described above, the airbag module of the present invention is an airbag module of a type that only a module cover is moved to actuate a horn switch and capable of preventing a portion around either of spoke-fitting portions of a module cover with a switch unit arranged therebetween from being excessively deformed, thereby providing an improved horn switch operational feeling.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An airbag module comprising:
   a folded airbag;
   a retainer to which the airbag is secured,
   a module cover including a plurality of spoke-fitting portions for covering the airbag; and
   a horn switch disposed between two of the spoke-fitting portions under a portion of the module cover not including one of the spoke fitting portions, the switch being actuated by pressing the module cover downward; and
   a plurality of stoppers for preventing the spoke-fitting portions interposing the switch therebetween from being moved downward in excess of a predetermined distance.

2. The airbag module of claim 1, wherein said module cover is allowed to move in a direction toward the retainer, each of said plurality of stoppers being a projection extending away from a rear surface of said module cover, and when the module cover moves the predetermined distance toward the retainer an end of the stopper comes in contact with said retainer or a horn switch supporting member as an integral part of the retainer, thereby preventing the further movement of the module cover.

3. The airbag module of claim 1, wherein said module cover is allowed to move in a direction toward the retainer, each of said plurality of stoppers being a projection formed on said retainer or a horn switch supporting member as an integral part of the retainer, and when the module cover moves the predetermined distance toward the retainer, the module cover comes in contact with an end of the stopper, thereby preventing the further movement of the module cover.

4. An airbag module comprising:
   a retainer for an airbag, the retainer including a hook;
   a module cover with an opening for receiving the hook to connect together the retainer and module cover;
   a horn switch; and
   a stopper for preventing the module cover from being moved toward the retainer greater than a predetermined distance,
   wherein the stopper is located in a region of the module cover where downward motion of the module cover is not limited by the horn switch.

5. The module of claim 4, wherein the stopper is connected to the retainer.

6. The module of claim 4, wherein the stopper is connected to the module cover.

7. An airbag module for a vehicle steering wheel comprising:
   a module cover having a plurality of spoke fitting portions;
   a first horn switch located under a portion of the cover not including one of the spoke fitting portions and a second horn switch located under one of the spoke fitting portions, wherein the first and second horn switches limit movement of the module cover away from a driver of the vehicle; and
   wherein the airbag module is configured so that movement of the airbag module away from a driver of the vehicle at a location where a horn switch is not present is limited by a stopper.

8. The module of claim 7, wherein the stopper comprises a projection connected directly to the module cover and extending downward away from the module cover so that when the module cover is depressed the projection contacts a stationary member disposed under the module cover thereby preventing further downward movement of the module cover.

9. The module of claim 7, wherein the stopper comprises a projection connected directly to a stationary member disposed under the module cover so that when the module cover is depressed the projection contacts the module cover preventing further downward movement of the module cover.

10. The module cover of claim 7, further comprising third and fourth horn switches.

* * * * *